United States Patent
Stolarz et al.

(10) Patent No.: US 9,800,706 B2
(45) Date of Patent: Oct. 24, 2017

(54) ELECTRONIC DEVICE INPUT/OUTPUT SYSTEM AND METHOD

(75) Inventors: Damien Phelan Stolarz, Canoga Park, CA (US); George Dean, IV, Simi Valley, CA (US); Zack Gainsforth, Lafayette, CA (US)

(73) Assignee: Robotarmy Corporation, Canoga Park, CA (US)

( * ) Notice: Subject to any disclaimer, the term of this patent is extended or adjusted under 35 U.S.C. 154(b) by 317 days.

(21) Appl. No.: 12/660,995

(22) Filed: Mar. 8, 2010

(65) Prior Publication Data

US 2010/0248784 A1 Sep. 30, 2010

Related U.S. Application Data

(60) Provisional application No. 61/158,586, filed on Mar. 9, 2009.

(51) Int. Cl.
*G06F 13/12* (2006.01)
*H04M 1/725* (2006.01)

(52) U.S. Cl.
CPC .... *H04M 1/72527* (2013.01); *H04M 2250/18* (2013.01)

(58) Field of Classification Search
None
See application file for complete search history.

(56) References Cited

U.S. PATENT DOCUMENTS 4,670,874 A * 6/1987 Sato et al. ............... 370/294
4,791,640 A * 12/1988 Sand ................. H04Q 11/0407
370/384
5,455,672 A * 10/1995 Lamonde et al. ........ 356/73.1
(Continued)

FOREIGN PATENT DOCUMENTS

JP 07030474 * 7/1993

OTHER PUBLICATIONS www.searchnetworking.techtarget.com/definition/frequency-shift-keying, frequency shift keying, published in Jul. 2000.*
(Continued)

*Primary Examiner* — Henry Tsai
*Assistant Examiner* — Dean Phan
(74) *Attorney, Agent, or Firm* — Athorus, PLLC (57) ABSTRACT

A system and method for coupling a peripheral to a device such as a smart phone. In a most general embodiment, the invention includes a first circuit for converting data signals output by the peripheral to analog signals; a connector for coupling the circuit to an input port of the device; and a second circuit disposed within the device for converting analog signals to data signals. In the illustrative embodiment, the first circuit is a frequency shift key generator and the second circuit is a frequency shift key detector. A host controller is coupled to the peripheral and a microcontroller coupled to the host controller. A serial port is coupled between the microcontroller and the host controller. A communication controller is coupled between the serial port and the frequency shift key generator. In a more specific embodiment, the device further includes a frequency shift key to binary data converter and a scan code to character set mapper and an arrangement for receiving and processing signals wirelessly via an infrared receiver.

30 Claims, 4 Drawing Sheets

(56) References Cited

U.S. PATENT DOCUMENTS

| | | | |
|---|---|---|---|
| 6,211,790 B1* | 4/2001 | Radomsky | G07C 9/00111 340/573.4 |
| 6,215,854 B1* | 4/2001 | Walance | 379/21 |
| 6,243,079 B1* | 6/2001 | Liu | 345/168 |
| 6,460,143 B1* | 10/2002 | Howard et al. | 713/323 |
| 6,512,467 B1* | 1/2003 | Hanko et al. | 341/22 |
| 2003/0011809 A1* | 1/2003 | Suzuki et al. | 358/1.15 |
| 2004/0093503 A1* | 5/2004 | Dombrowski | G07C 9/00087 713/186 |
| 2004/0104268 A1* | 6/2004 | Bailey | G06Q 20/32 235/439 |
| 2006/0059293 A1* | 3/2006 | Wurzburg et al. | 710/313 |
| 2006/0223581 A1* | 10/2006 | Jacobs et al. | 455/557 |
| 2006/0270940 A1* | 11/2006 | Tsukashima et al. | 600/529 |
| 2009/0088142 A1* | 4/2009 | Baribault | H04M 3/42 455/418 |
| 2009/0205036 A1* | 8/2009 | Slaton | H04L 63/083 726/9 |
| 2009/0313262 A1* | 12/2009 | Cang et al. | 707/10 |
| 2010/0184479 A1* | 7/2010 | Griffin, Jr. | 455/557 |

OTHER PUBLICATIONS

Curt Franklin, How Bluetooth Works, Mar. 2005, howstuffworks.com, p. 1-6.*
wepopedia.com, iphone, Jul. 13, 2007, pp. 1-2.*
JP07030474 translation, Jan. 31, 1995, p. 1.*

* cited by examiner

ELECTRONIC DEVICE INPUT/OUTPUT SYSTEM AND METHOD

REFERENCE TO RELATED APPLICATION

This is a nonprovisional application that claims priority from a provisional application No. 61/158,586 filed Mar. 9, 2009 and entitled ELECTRONIC DEVICE INPUT/OUTPUT TECHNIQUE.

BACKGROUND OF THE INVENTION

Field of the Invention

The present invention relates to systems and methods for establishing data communication between electronic devices. More specifically, the present invention includes systems and methods for establishing bi-directional data communication between electronic devices and for establishing uni-directional and bi-directional communication between devices and peripherals.

Description of the Related Art

In the field of computerized devices, there are many different interface ports used for communication. RS-232 serial communication, for inter-terminal communication over copper wires, was standardized in 1969. Since that time, many additional wired and wireless techniques have been developed for inter-device communication.

In recent times, there has been a proliferation of mobile devices. The 1990s saw the emergence of PDAs (personal digital assistants), and the last 10 years have seen the emergence of "smartphones", phones with a general-purpose central processing unit capable of running multiple simultaneous programs, much like a computer. Similarly, portable media players (PMPs), such as the iPod have developed computer-like functionality. In the last several years, over a billion mobile phones have been sold each year, and an increasing number of these phones are being designed as "smartphones", incorporating general-purpose computing technology coupled with an always-on Internet connection.

Because these devices are in essence portable computers, they are used for conventional computer functionality, including email, address book, calendaring, and document manipulation. There are various ways to get this sort of information onto portable devices and to connect peripherals to such devices. Unfortunately, all of the current methods have limitations with regards to nearby, immediate, low-latency connectivity.

Because these devices are in essence portable computers, the manufacturers have allowed a controlled level of third-party application development on their platforms. Examples of mobile platforms include the Microsoft® Windows® Mobile platform, the Symbian platform, the Palm® Palm OS® and web OS™ platforms, the Google™ Android™ mobile application platform and the Apple® iPhone® OS platform. Each of these mobile device operating systems resembles in many respects a traditional desktop computer operating system. However, the internals of many of these operating systems are restricted in such a way that new device drivers—the software that allows for additional hardware devices to be connected or for additional network protocols to be implemented—are not permitted.

The smartphone type devices communicate to the Internet using the TCP/IP protocol and to other devices such as computers and printers through local-area and wide-area wireless networking. Hardware transmission standards that support this include Wi-Fi (802.11); cellular wireless networking such as CDMA, UMTS, HSDPA, GPRS and EDGE; and wide-area networking such as WiMAX (IEEE 802.16). However, device-to-device and device-to-peripheral communication is awkward with these standards. To have two devices communicate in this manner, they must either communicate through an intermediary server or website (the most common method), adding delay and complexity of setup. For instance, if one device is to send a single contact of an address book to another device—for example, in exchanging business contact information—there is no straightforward technique for sending the contact directly, and the most common alternative, sending the contact over email, is less direct and not instantaneous, and may not even be supported by one of the devices.

If devices are to communicate in a peer-to-peer manner (i.e., sending network packets directly from one device to another), it is necessary to have both devices communicate with the same network protocols and the same application-layer protocols, and to solve issues such as network peer discovery. In practice, due to concern about viruses inherent in any network protocol, devices are very restricted in what they are designed to do on a direct basis over a network, and direct exchange of data between devices is thus inhibited over a network.

In the case of connecting peripherals, the cost and complexity of adding wireless local-area networking to a simple peripheral device has prevented the attachment of keyboards, mice, joysticks and other peripherals to devices via wireless networking. In practice, there are no known Wi-Fi keyboard peripherals.

Another limitation of Wi-Fi and other wireless techniques is that they require both devices to be wireless network receivers and transmitters, and that they require constant connectivity for devices to work. This consumes much power, requiring portable peripherals and devices to carry larger batteries, and requiring frequent recharging or replacement of batteries.

The Bluetooth wireless networking standard was developed as a point-to-point wireless technique for device-to-device and device-to-peripheral connection. It is specifically designed to minimize power use. Although it overcomes some of the limitations of wireless networking approaches by specifically enabling point-to-point, device-to-device communication, it still requires larger batteries, bulkier devices and requires complex protocol support. Many devices that incorporate some Bluetooth features do not allow application-level developers to access the features. For instance, one device may support transmission of address book entries to another device, but the other device, even though it has the necessary hardware support, does not implement the correct software to accept the address book transmission. Because Bluetooth software support is implemented by the device manufacturer, the device manufacturer can decide, for any reason, not to support parts of the standard.

Additionally, unlike TCP/IP and networking standards, Bluetooth is not designed for ad-hoc creation of new communication protocols. Thus, an application developer who simply wanted to use Bluetooth to implement a proprietary or industry-standard communication scheme on top of Bluetooth would be limited to the protocols the manufacturer enabled on the device. In addition, in the case of peripherals, such as Bluetooth keyboards, if a mobile device is not designed to work with a Bluetooth keyboard by the manufacturer, it is effectively impossible for an application developer to implement support for it.

Infrared light transmission, a line-of-sight wireless communication technique, was popular for one-way and two-way inter-device communication in the 1990s and still sees some use today, but has been eclipsed by Bluetooth for peripheral interconnection. The Palm series of PDA devices traditionally could accomplish the task of sending an address book contact entry from one device to another using serial binary communication over infrared communication standards such as IrDA (a high-speed, infrared serial protocol).

However, most mobile phones, PDAs, smartphones and portable devices only use infrared today as a remote control input standard, and usually only implement support for a single remote. For instance, many Macintosh computers and devices such as iPod docking stations can use an Apple remote control. Even though they have infrared receiver hardware, there is no application-level ability to receive any other infrared protocols or support any other infrared devices than the Apple remote. Many other devices with infrared support have similar limitations. The existence of an infrared receiver or transmitter on a device provides little hope that any device or protocol not supported by the manufacturer will be supported. Even though the vast majority of television and other remotes in market use unidirectional infrared transmission, and even though universal remotes have shown the versatility of this technique for device interoperability, this interoperability has rarely been demonstrated in the area of computing devices. For several years, a number of infrared keyboards were developed, and a brief era of standardization was achieved wherein a dozen or so PDA devices supported perhaps a dozen in-market portable infrared keyboards. However, the current generation of mobile devices, lacking support for the IrDA or general infrared support, cannot use these keyboards.

The Universal Serial Bus (USB) is a wired hardware communication standard and is the most common interface on mobile devices, phones, PDAs, portable computers and smartphones for charging and data communication, but is not commonly used for peripheral interconnection. Most mobile devices can be connected in a master/slave relationship with a personal computer, such that the personal computer recognizes the mobile device as a peripheral. Mobile devices usually change to a "peripheral" mode, and specialized software running on the personal computer, usually provided by the manufacturer, allows custom communication with the device, such as synchronizing address books and contacts, music, calendars and other data. Because of the master/slave design of USB, USB cannot be readily used to connect two devices, or to connect peripherals to a mobile device that itself is designed to be a peripheral, without a personal computer intermediary. Thus, address book contact exchange cannot be readily achieved by connecting two devices via USB, nor can a USB keyboard—a ubiquitous and inexpensive device—be connected to a mobile device: even though both the keyboard and the mobile device "have USB," they are both slave devices.

Proprietary docking connectors are the most common approach to peripheral interconnection for mobile devices. PDA, phone, smartphone and portable media player manufacturers have developed custom physical and electrical connections on their devices to build an ecosystem of peripherals that only work with their devices. For instance, the Apple iPod® dock connector standard has enabled a large aftermarket ecosystem of automobile integration adapters, speakers, video playback devices, microphones, remote controls, pedometers, projectors and other peripherals. Similar approaches are used by mobile phone and portable media player manufacturers to create proprietary peripheral interfaces for remote controls, chargers and audio outputs.

Beyond physical and electrical limitations, manufacturers often develop custom protocols, inaccessible to application developers, so that even if a device exists and can be coupled to the proprietary electrical and mechanical interface, it is impossible for an application developer to support the device or access its functionality. For example, there are microphone input peripherals designed to enable audio input for iPod devices that lack a microphone. Even though they use the standard connector and have even been approved for use with some models of iPod, they cannot work with the latest iPods, merely because Apple has not provided the software support (device drivers) to allow access to them by application developers, and because there is no way for application developers to develop these device drivers or provide these device drivers to consumers.

None of the existing systems have been able to provide mobile device application developers with a reliable technique for accomplishing inter-device communication regardless of hardware design limitations and regardless of manufacturer.

SUMMARY OF THE INVENTION

The need in the art is addressed by the present invention, which provides a system and method for coupling a peripheral to a device such as a smartphone. In a most general embodiment, the invention includes a first circuit for converting a data signal output from the peripheral to analog (e.g., audio) signals; a connector for coupling the circuit to an input (e.g. audio) port of the device; and a second circuit disposed within the device for converting the analog signals to (e.g. digital) data signals.

In the illustrative embodiment, the first circuit is a frequency shift key generator and the second circuit is a frequency shift key detector. A host controller is coupled to the peripheral and a microcontroller coupled to the device. A serial port is coupled between the microcontroller and the host controller. A communication controller is coupled between the serial port and the frequency shift key generator.

In a more specific embodiment, the device further includes a converter that transforms frequency-shift-keyed data to binary data, a scan-code-to-character-set mapper and an arrangement for receiving and processing signals wirelessly via an infrared receiver.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof, and additional fields in which the present invention would be of significant utility.

Some portions of the detailed descriptions that follow are presented in terms of algorithms and symbolic representations of operations on data bits within a device memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proved convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "selecting," "displaying," "sending," "receiving," "updating," "modifying," "assigning," "requesting," "notifying," "communicating", "interfacing" or the like, refer to the actions and processes of a mobile device or similar electronic device having processing circuitry and components that manipulate and transform data represented as physical (electronic) quantities within the system's registers and memories into other data similarly represented as physical quantities within the device system memories, registers or other such information storage, transmission or display devices.

The present invention also relates to an apparatus for performing the operations herein. This apparatus may be specially constructed for the required purposes or it may comprise a general-purpose device selectively activated or reconfigured by a program stored in the device. Such a program may be stored in a computer-readable storage medium, such as, but not limited to, any type of disk— including floppy disks, optical disks, CD-ROMs and magneto-optical disks—read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein can be implemented as a particular electronic device, component, computer or other apparatus. However, various general-purpose systems may also be used with the programs in accordance with the teachings herein, or it may prove convenient to construct more specialized apparatus to perform the required method steps. The required structure for a variety of these systems will become apparent from the description below. In addition, the present invention is not described with reference to any particular programming language. It will be appreciated that a variety of programming languages may be used to implement the teachings of the invention as described herein.

A machine or computer readable medium includes any mechanism for storing information in a form readable by a computer or similar machine. For example, a computer-readable medium includes read-only memory ("ROM"), random access memory ("RAM"), magnetic-disk storage media, optical storage media, flash memory devices or other types of machine-accessible storage media.

In accordance with the present teachings, a technique for serial communication is implemented that utilizes the audio input and output facilities of a device. Modulating audio to achieve binary communication is called "modulation-demodulation," and devices that implement this technique are called "modems." The first audio modems were implemented in the 1950s, and by the early 1960s, 300-bit-per-second (bps) communication was being achieved over phone lines. One modulation scheme used, called "V.21," used binary frequency-shift keying (BFSK, or "binary FSK"). In this technique, two tones (pitches) were played alternately, one representing a binary "1" and one representing a binary "0". In the late 1970s, early personal computers used similar forms of modulation to store and retrieve programs on cassette tape. For instance, the Apple II computer loaded programs at about 180 bytes per second from cassettes by using alternating tones to represent binary digits.

In the 1990s, digital signal processor chips were incorporated into personal computers, allowing them to implement the more complex, higher-bit-rate modem protocols that run at 28.8 kbps and 56 kbps, in software. As computer CPUs have increased in speed, they have gained the ability to implement various modulation schemes in software alone without additional DSP hardware.

Recently, there have been a number of uses of computer audio input and output ports for digital communication. For long-distance radio communication, many of the shortwave modulation schemes have been implemented as software for sound cards on PCs. Sound cards have been used to implement bidirectional communication over several kilometers of copper wire in open-source projects like AuDSL.

For short-distance, line-of-sight applications, the open-source LiRC software project includes support for infrared reception through the microphone port of a PC sound card. Similarly, a product developed by Griffin Technologies several years ago allowed Windows Mobile—based PDAs to transmit infrared codes to control televisions using the audio output facility of the PDA. Similar techniques have been demonstrated for the iPhone device, performing infrared transmission using the audio output facility. Very recently, on 28 Dec. 2008, tellart.com released a video demonstrating the ability to input a single changing value between 0 and 255 by having the iPhone measure the audio amplitude (volume) of a sound looped through a potentiometer, for the purpose of connecting the iPhone to physical sensor peripherals. However, this technique, though effective for real-time measurement of time-varying quantities, is ineffective for uni-directional or bidirectional data transfer.

Figure 1:
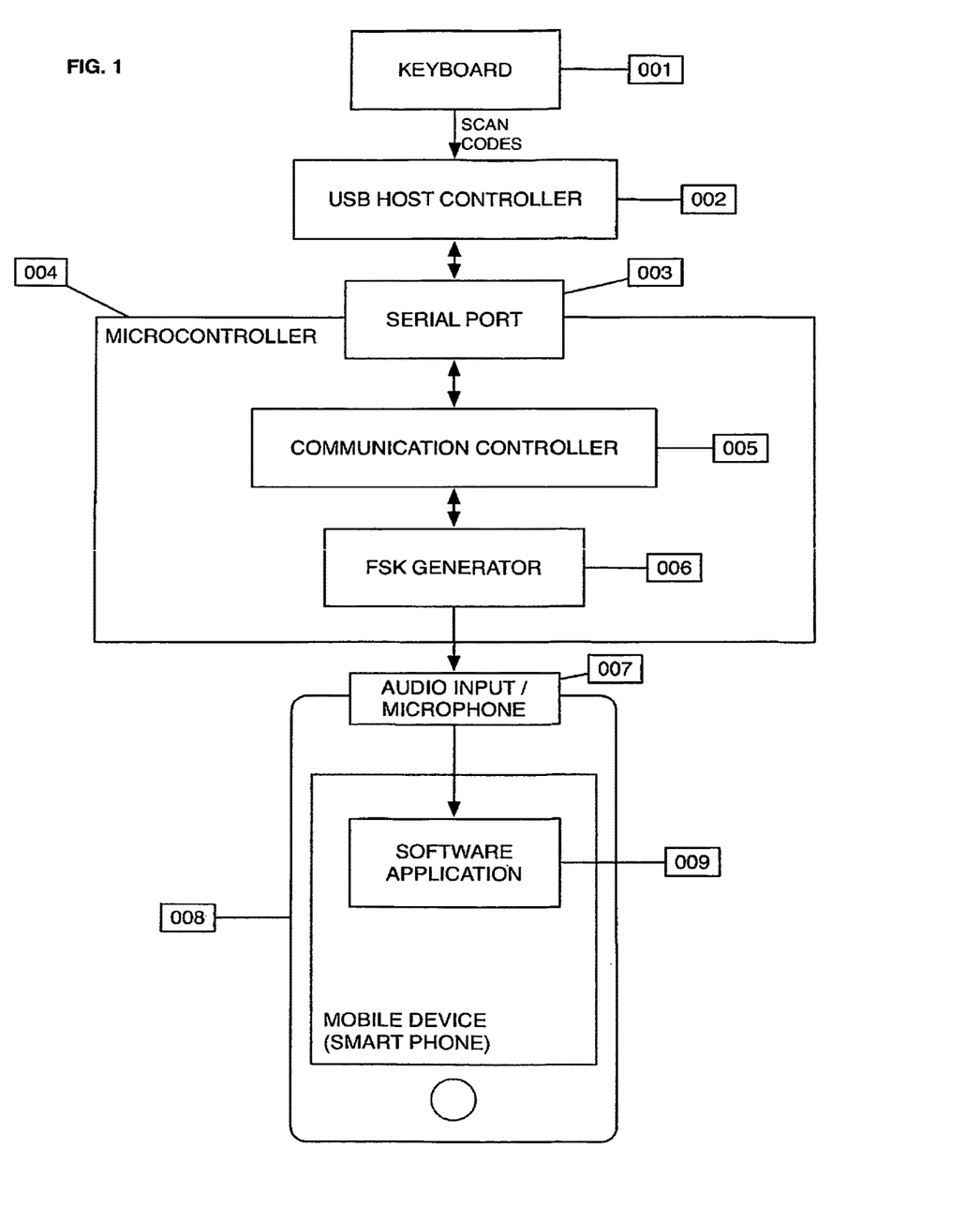
FIG. 1 is a diagram of one embodiment of an apparatus for connecting a keyboard to a smart phone device through the microphone port of the smart phone device in accordance with the present teachings.

FIG. 1 is a diagram of one embodiment of an apparatus for connecting a keyboard to a smartphone device through the microphone port of the smartphone device in accordance with the present teachings. As shown in FIG. 1, a conventional keyboard 001 is connected to a USB host controller 002 that connects to the serial port 003 of a microcontroller 004 programmed to buffer data from the serial port 003. Signals from the keyboard 001 are stored temporarily in a communication controller 005. The communication controller 005 may be implemented in software executed by a microprocessor (not separately shown) within the microcontroller 004.

In the illustrative embodiment, the signals from the keyboard are modulated as frequency-shift-keyed (FSK) audio signals by FSK Generator 006. In accordance with the present teachings, the audio output of the FSK generator 006 is fed to an audio input or microphone port 007 of a mobile device 008, where it is interpreted by a software application 009.

One skilled in the art would understand that any number of additional devices with different functions, without limitation—including computer mice, credit card readers, human interface devices, game controllers and printers—could also be connected to the USB host controller 002.

Figure 2:
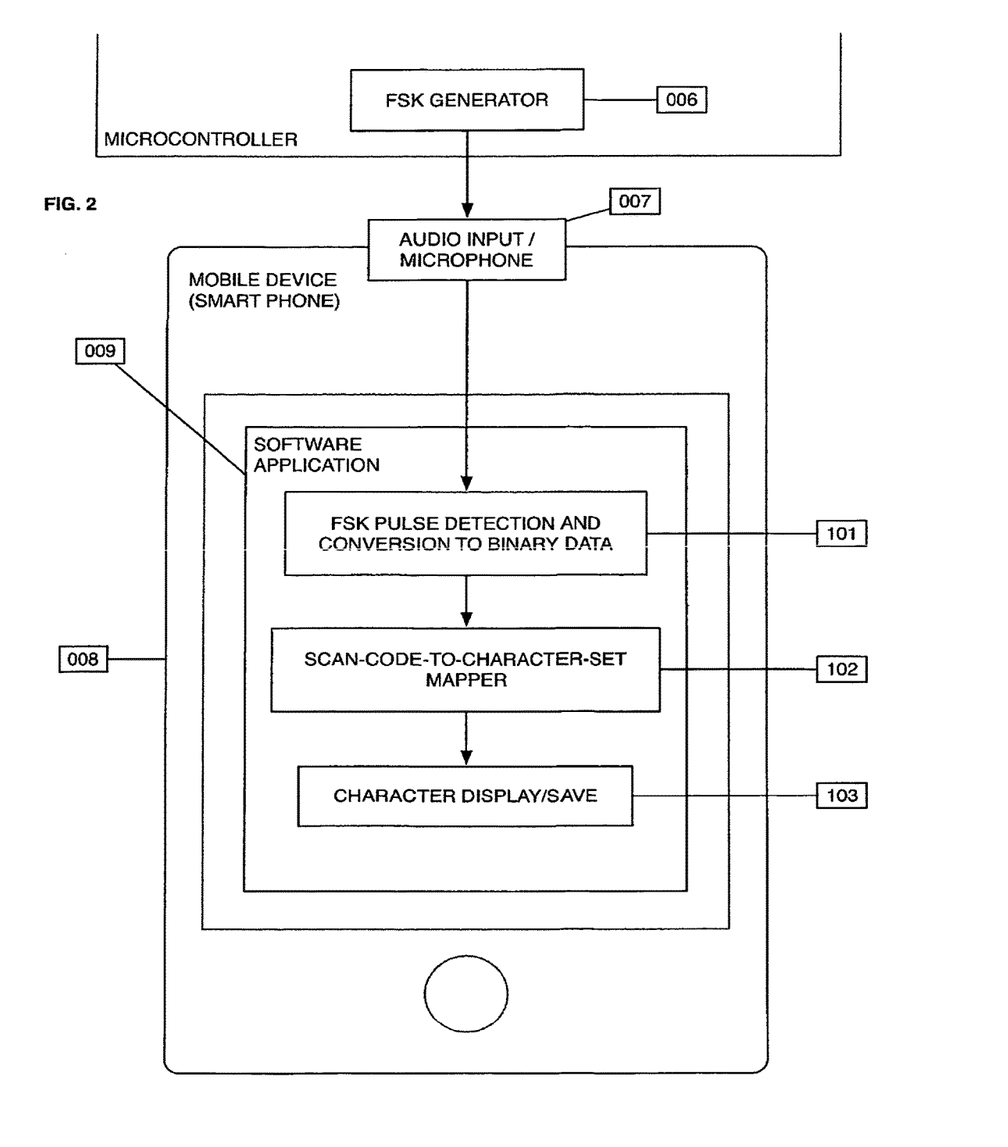
FIG. 2 is a diagram of one embodiment of the software running on the smart phone that processes the data sent to it by an apparatus such as the one in FIG. 1.

FIG. 2 is a diagram relating to FIG. 1 and illustrating the functions of the software application 009 stored in the flash memory of portable device 008. The software performs the functions of detecting frequency-shift-keyed data (101) and converting this to binary data, assembling full bytes of this data to be compared to a scan code table (102) to determine what key was pressed or, for non-keyboard input, what symbol was sent. The software then (103) displays the results or saves them to memory or fixed storage, as appropriate to the application.

Figure 3:
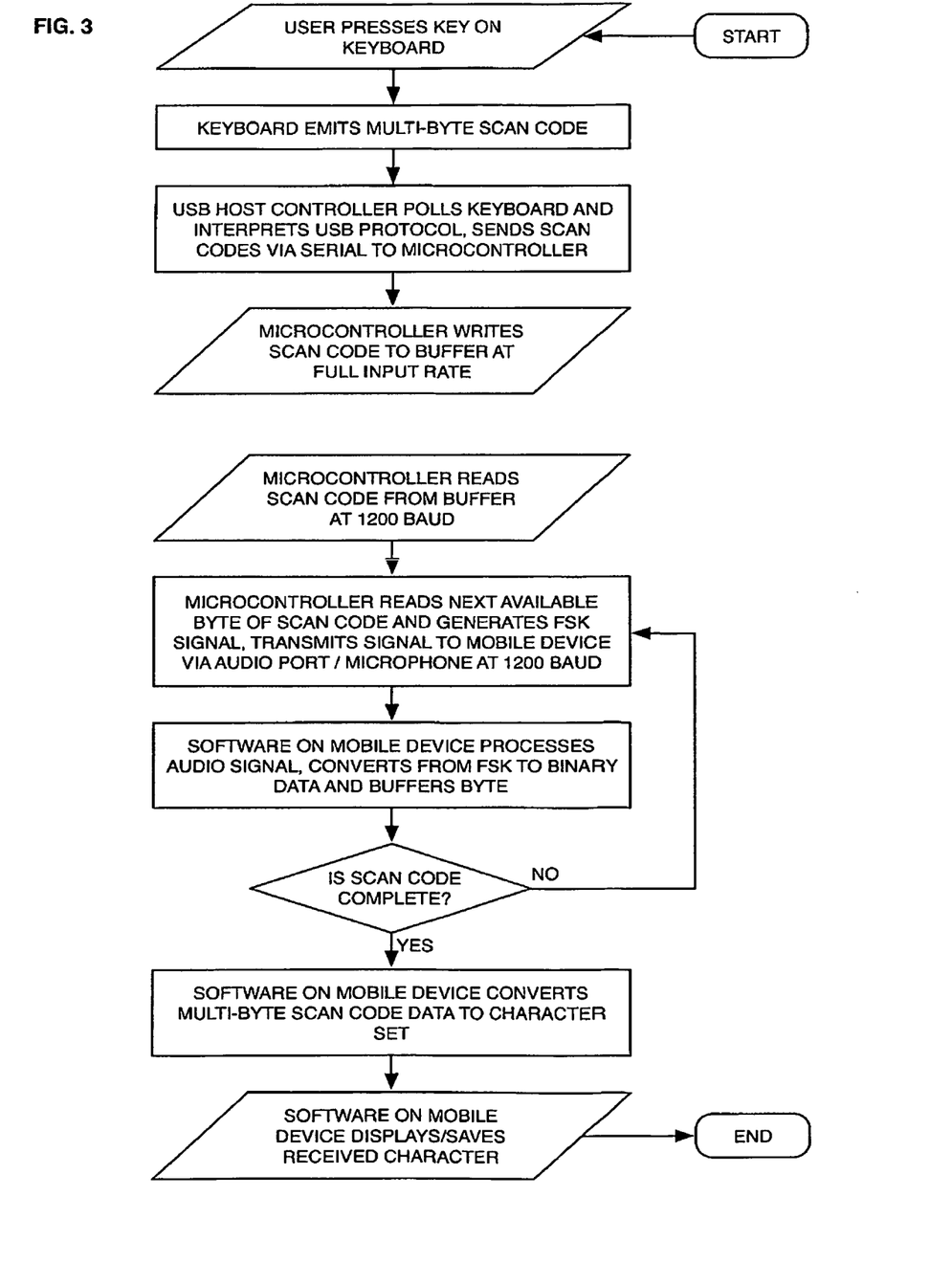
FIG. 3 is a flowchart of one embodiment of a system for connecting a keyboard to a mobile device.

FIG. 3 is a logic flow diagram for an embodiment of the invention showing the data flow as keyboard data is entered into a mobile device. The user presses a key on the keyboard, which, in the illustrative embodiment, emits a multi-byte scan code. The USB controller receives this data and sends it to the microcontroller 004. The microcontroller 004 buffers the data and adjusts bit rate as necessary for the device to which it is being sent. In the illustrative application, the data is slowed to fit the 1200-baud FSK rate available to the application software running on the smartphone.

The microcontroller 004 converts the data to FSK audio and plays it into the microphone port of the mobile device. Application software running on the mobile device decodes the FSK audio into binary digits, assembles the binary digits into byte sequences and interprets sequences as keyboard scan codes, which are then either stored in fixed or temporary memory or displayed, as appropriate.

In the illustrative embodiment, the microcontroller 004 of FIG. 1 is implemented with a hybrid analog/digital chip manufactured by Cypress 401 (PSoC: CY8C29466-24PXI) which converts bidirectional serial data to a form that can be received by a mobile device via the analog input and output port (e.g., a headphone/microphone jack) of the mobile device 008. It also implements an infrared and wired input capability for connecting an infrared or direct-wired infrared keyboard 001.

Although there are a number of ways to get data into and out of most smartphones and other devices—e.g., the Apple dock connector, Bluetooth, the camera and screen, and Wi-Fi—none of these are well suited for simple, low-speed bidirectional communication with inexpensive components. In addition, several of these inputs are simply inaccessible to independent developers, as in the Apple iPhone SDK. The audio port, however, is accessible from the iPhone SDK—both for playing audio and for recording it. Hence, in accordance with the present teachings, a device design is taught that interfaces with one's device (e.g., iPhone) via the microphone/audio jack and sends bidirectional 1,200-baud serial data.

Whereas the present invention is illustrated herein with respect to the iPhone mobile phone, it should be understood that the present invention is not limited to any particular device.

Wired External Device Connections

Figure 4:
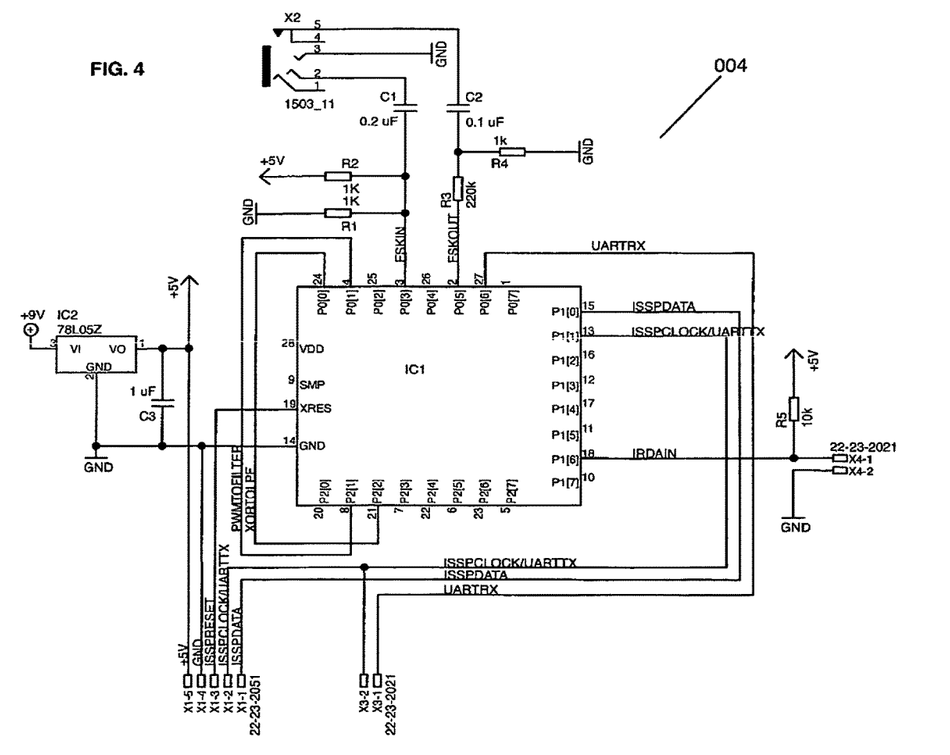
FIG. 4 shows an illustrative implementation of the microcontroller of FIG. 1.

For a wired implementation, to provide the microcontroller 004 of FIG. 1, we start with a specialized microcontroller such as the Cypress PSoC (Programmable System on a Chip) 401 (PSoC: CY8C29466-24PXI). FIG. 4 shows an illustrative implementation of the microcontroller 004 of FIG. 1. It allows for access to a UART (serial port) on one side and talks to one's device using binary audio FSK, a similar technique used on some of the first modems (300 baud).

Frequency-shift keying uses alternating analog signals to send information: for example, in binary FSK, a tone of 8,000 hertz might signify a digital '1', and 4,000 hertz a digital '0'. Two frequencies are chosen for this project for the following reasons:

1. Sound must be easily played and recorded through the device audio circuitry.
2. The use of harmonic frequencies (8,000 hertz=2*4,000 hertz) facilitates the use of a simple method to decode the signals.

To build the circuit, the following electronic components are recommended for the illustrative implementation:
Cypress PSoC CY8C29466-24PXI
Cypress PSoC MiniProg USB programmer CY3217
Breadboard (a solder less breadboard will work)
Three 1 kΩ resistors
One 220 kΩ resistor
One 0.1 µF ceramic capacitor
One 0.2 µF capacitor (or two 0.1 µF capacitors in parallel)
A pair of device headphones
5-9V power source (such as a 9V battery)
LM7805 voltage regulator (unless using a steady 5V power source)
5-pin male 0.100" K.K. header
A 5V UART such as the FTDI TTL-232R cable In the illustrative embodiment, the USB host controller 002 of FIG. 1, is implemented with a Vinculum VNC1L USB Host Controller supplied by FTDI (http://www.vinculum.com). As will be appreciated by those of ordinary skill in the art, the same basic circuit may be used for both the wired and wireless implementations disclosed herein, with appropriate firmware.

FSK generators and detectors are known in the art. For example, to build the FSK generator 006 and detector 101, the following papers may be used:

1. FSK Generator 006—Cypress Application Note AN2098 describes how to transform digital bits into an FSK audio signal: http://www.psocdeveloper.com/docs/appnotes/an-mode/detail/an-pointer/an2098/an-file/122.html
2. FSK Detector 101—Cypress Application Note AN2336 describes how to decode an FSK audio signal into digital bits: http://www.psocdeveloper.com/docs/appnotes/an-mode/detail/an-pointer/an2336/an-file/124.html.

The circuit 006 takes serial data from the computer and converts it to frequency-shift-keyed data. It takes a carrier signal, such as a sine wave, and modulates it, in the illustrative embodiment, toggling it between 4,000 Hz and 8,000 Hz.

Illustrative FSK specifications are:
1200 baud 8-N-1
Binary 1: 8 kHz

Binary 0: 4 kHz In the illustrative embodiment, the baud rate to the device is approximately 1266 (to provide a small buffer such that a 1200 baud device connected to the FSK circuit does not jam.) The 1200 baud should be sufficient, inasmuch as the chip will should not send anything at a faster rate than 1200 baud.

The bytes are sent as little-endian ASCII (LSB/MSB). For example, "U" is sent as the following 9 bits:
Bit 0: 4 kHz start bit
Bit 1: 8 kHz
Bit 2: 4 kHz
Bit 3: 8 kHz
Bit 4: 4 kHz
Bit 5: 8 kHz
Bit 6: 4 kHz
Bit 7: 8 kHz
Bit 8: 4 kHz Standby is at 8 kHz—if the chip is not sending data, it emits a constant 8 kHz tone.

The wired implementation uses the audio port, a method of communicating with a device or second-generation iPod touch. The circuit is capable of communicating with a device with a microphone input, not just the device that is used as an example. The internal microphone of an iPhone mobile device typically has a resistance of about 1K Ω (1 kilo-ohms). This resistance is used by the device to detect whether a microphone is plugged in. When conventional headphones are plugged in, the sleeve on the plug bridges both the microphone and ground pins of the internal jack. Thus, when the iPhone senses zero ohms, it detects that only headphones are connected. If it senses 1K, it detects that a microphone is present.

Using a modified version of the iPhone modem Cypress firmware from the bidirectional serial implementation described above, one can attach an external portable keyboard to one's iPhone mobile device.

Using a modified version of the iPhone modem Cypress firmware from the bidirectional serial implementation described above, one can attach an external portable keyboard to one's iPhone.

Illustrative keyboards 001 that may be used include: a Microhmovations IrDA Palm keyboard, which has an unusual binary protocol (scan codes) due to its unusual keyboard layout, and a Targus keyboard, whose scan codes match a standard PC keyboard. Both were designed in the PDA (e.g., PalmPilot, iPAQ) era, and use a form of infrared called IrDA to send key presses to a device.

Wireless External Device Connections

The circuit discussed above can detect signals through ambient audio as-is. Adding an IrDA receiver to the circuit and placing the unmodified infrared keyboard in close line-of-sight proximity to the infrared receiver achieves the same functionality.

In operation, the "IrDA" signal from the keyboard provides a short to the audio input via a 5 kΩ pull-up resistor. Thus, the standby voltage is 5 volts (in the illustrative embodiment) and the value goes to 0 volts when shorted for brief 5 microsecond pulses as the keyboard shorts the line. A series of pulses (or lack thereof) indicates what data is being transmitted. In the illustrative embodiment, the pulses are sent at 9,600 baud. Therefore, to read the data sent by the keyboard, the system has to do the following:
1. Using a DigInv block on the Cypress chip, use an interrupt to call a software function in the code each time a negative pulse (zero) arrives.
2. Wait for a first pulse. This is the start bit, which signifies the start of a byte. The function will start a timer that goes for 3/2's of a 9600 baud period (150 microseconds).
3. If subsequent pulses arrive during the timer period, the software function notes them. If no pulse occurs, the function is not called.
4. When the timer is up, then the system checks to see if the interrupt function was called. If not, that would mean the last bit was a logic 1 (no pulse). If it was called, then the bit was logic 0. Next, reset the timer for a single 9600 baud period (100 microseconds).
5. Repeat step (4) seven more times.
6. On the last bit (the eighth), write the byte to the FSK system—which is identical to what was done above. Also turn off the timer, and have the interrupt function wait for another start bit.
7. At this point, one will be in the middle of a stop bit, which is always logic 1, (no pulse), signifying the end of the byte.

Because this keyboard sends data at 9600 baud, the circuit buffers data to some extent, although one cannot typically type faster than 1200 baud. This is because some key presses generate two or three bytes: these are scan codes, not ASCII characters. Because scan codes vary from keyboard to keyboard, it is best to determine what the scan codes are, either by specification or by simply pressing keys. Note that both the press and release of a key generate a scan code, as do modifier keys like SHIFT. A single character typed can generate 2-6 bytes of data. With stop bits, the total could be up to 54 bits for a single key press. A 120-word-per-minute typist can type 10 characters per second. Yet even with overhead, 540 bits per second fits into the 1200 baud bandwidth budget.

It is also worth noting that, in accordance with the illustrative embodiment, the keyboard only uses the microphone input. Thus, by using a simple 'Y' splitter and ensuring the software does not open the audio output, one can listen to audio while typing in accordance with the present teachings. Inasmuch as kits with the keyboard pre-assembled are straightforward to produce, a library that adds keyboard support can be integrated into any iPhone application by one of ordinary skill in the art. Thus, a programmer of ordinary skill could create terminal programs, note-taking programs and even full-screen text editors with arrow controls. Given that some old serial mice originally ran at 1,200 baud, an improved circuit can be produced with both mouse and keyboard support. Thus, the present invention allows an iPhone mobile phone to operate as a desktop personal computer with a keyboard by plugging the iPhone into a computer screen for display.

For the illustrative implementation, a simple circuit is wired that takes infrared pulses and converts them to sound. Code is provided to recognize the signals from the IR (infrared) remote that comes bundled with most Macintosh computers. These steps are well within the level of skill of a person of ordinary skill in the art. See, for example, *iPhone Hacks: Pushing the iPhone and iPod touch Beyond Their Limits*, written by Damien Stolarz et al. and published by O'Reilly Media, first edition (Apr. 16, 2009), ISBN-10: 0596516649, ISBN-13: 978-0596516642, the teachings of which are hereby incorporated herein by reference.

The present invention has been illustrated by way of example, and not by way of limitation, with the Apple iPhone mobile device. However, the present teachings are not limited thereto. Those of ordinary skill in the art will appreciate that the present teachings can be utilized with other devices without departing from the scope thereof. That is, it should be understood that the present teachings can be applied without limitation to any device with audio input capability, such as smartphones, mobile cellular phones, personal computers, tablet PCs, portable media players (PMPs) with audio input, portable and mobile Internet devices (MIDs), ultra mobile PCs (UMPCs), personal navigation devices (PNDs), computing accessories, wearable computers, laptops, handhelds, personal digital assistants (PDAs), system-on-a-chip devices, portable video recorders, portable audio recorders, or any other computing device with an audio input port or microphone.

It is further understood that this invention applies as well to any device that only has audio output capability but is used to communicate uni-directionally to a device with audio input capability as described in the invention. Such devices could include, without limitation, keyboards with audio output, peripheral devices with audio output, mice, bar code scanners, portable media players, portable audio devices, portable video devices, credit card readers, digital storage devices, ambient audio transmitters such as public address (PA) systems, amplifiers, mixers, boom boxes, DJ systems, performance systems, flat-screen televisions, movie projection systems, surround sound systems, in-vehicle audio systems, satellite, HD or terrestrial radio transmission systems, mixing boards, computers, solid-state audio players, CD players, DVD and Blu-ray Disc players, digital media playback systems, or other fixed or portable electronic devices.

In another embodiment, the audio can be transmitted wirelessly—e.g., via RF or Bluetooth—and the same approaches can be used to modulate and transmit data. For instance, a Bluetooth hands-free headset can be disassembled, the microphone and speaker wires of this Bluetooth hands-free headset can be connected to the audio input and output of our exemplary FSK circuit, and the FSK circuit can be connected to an external device, such as a keyboard or bidirectional communications device. If the headset is "paired" (in Bluetooth terminology, connected) to the mobile phone, and the software on the mobile phone is configured to receive and send audio through the Bluetooth hands-free headset, the data will transfer over the air. The Bluetooth headset should be selected to use higher audio quality modes (such as A2DP if available), and the frequencies and speed of transmission can be lowered to decrease the error rate, since Bluetooth adds its own layers of modulation and digital compression to the audio signal. This allows the keyboard or other device to be connected and communicate wirelessly to the mobile device over Bluetooth.

Similarly, any one-way or bidirectional radio frequency-based (non-Bluetooth) analog audio transmitter can be used in the same way as Bluetooth. The sending portion of the transmitter can be connected to the FSK circuit and then to the keyboard, and the receiver to the input of the mobile device. This allows the keyboard to be wirelessly connected to the mobile device via RF.

The teachings provided herein could be used in a variety of ways, for example:

a. A software vendor could provide a data-transfer software library or application which runs on a mobile device for the purpose of achieving data transfer over the audio input or output jacks.

b. An accessory maker, who does not create or sell the software, could use the inventive technique to send data to or from their attached device. For instance, a GPS receiver could play out its location data as an FSK or other modulated data stream, and not implement the audio receiver.

c. A mobile device manufacturer could create a phone or mobile device that can receive modulated data streams via audio. The hardware manufacturer might include firmware, software or hardware integrated into the device to implement reception of FSK or other modulated signals (there are many kinds of modulation) to send data to a device.

d. A vendor could produce an end-to-end tools solution that provides the external hardware that connects to the device, the software that runs on the device, and firmware to run on the external hardware.

e. A 'cloud service' could decode the signals. That is, the phone could be relatively "dumb," and a device could be used to communicate to the 'cloud' through a mobile phone. A software vendor could implement a solution, whereby users transmit data from an accessory, through the audio input of their phone. The data would then be uploaded without significant change to a server, where it would be decoded.

It should also be noted that the present teachings enable device-to-device as well as device-to-peripheral connection. That is, the peripheral could be another mobile device within the scope and meaning of the present teachings.

Thus, a method, a system and an apparatus for connecting peripheral devices to mobile devices and for interconnecting mobile devices have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

It is therefore intended that the appended claims cover any and all such applications, modifications and embodiments within the scope of the present invention.

Accordingly,

What is claimed is:

1. A system for coupling a credit card reader to a mobile device, the system comprising:

a hardware component that connects to the mobile device and the credit card reader, the hardware component including:

a first mechanism configured to receive data provided by the credit card reader;

a communication controller for buffering the data received from the credit card reader prior to conversion by a first circuit;

the first circuit configured to convert the data to an analog audio signal;

a connector to couple the hardware component to an audio input port of the mobile device, wherein:

the connector bridges a microphone pin of the audio input port such that the mobile device detects a presence of the connector in the audio input port; and the connector provides an audio communication between the hardware component and the mobile device and communicates the analog audio signal from the hardware component to the mobile device;

a second mechanism on the mobile device configured to receive the analog audio signal and convert the analog audio signal into binary data; and a third mechanism on the mobile device configured to upload the binary data to a cloud service for decoding.

2. The system according to claim 1 wherein the first mechanism comprises a host controller coupled to the credit card reader.

3. The system according to claim 1 wherein the first mechanism comprises a serial port for coupling to the credit card reader via a host controller.

4. The system according to claim 1 wherein the first circuit comprises a frequency shift key generator.

5. The system according to claim 1 further comprising an arrangement for wirelessly coupling the credit card reader to the hardware component.

6. The system according to claim 5 wherein the arrangement for wirelessly coupling the credit card reader to the hardware component comprises an infrared receiver.

7. The system according to claim 5 wherein the arrangement for wirelessly coupling the credit card reader to the hardware component comprises a radio receiver.

8. The system according to claim 5 wherein the arrangement for wirelessly coupling the credit card reader to the hardware component comprises an optical receiver.

9. A computer-implemented method for connecting a credit card reader to a cloud service through a mobile device, comprising:
  receiving, at a hardware component connected to the credit card reader, digital data from the credit card reader;
  converting, with the hardware component, the digital data into an analog audio signal; and
  delivering the analog audio signal to an audio input port on a mobile device through a connector of the hardware component that couples the hardware component to an audio input port of the mobile device, wherein the connector bridges a microphone pin of the audio input port such that the mobile device detects a presence of the connector in the audio input port;
  decoding, at the mobile device, the analog audio signal into binary data;
  sending, from the mobile device, the binary data to the cloud service for decoding; and
  comparing, at the cloud service, the binary data to a scan code to decode the binary data.

10. The computer-implemented method according to claim 9 wherein the mobile device is a smart phone.

11. The computer-implemented method according to claim 10 wherein the mobile device is an IPHONE® smart phone.

12. The computer-implemented method according to claim 9 wherein the hardware component includes a host controller.

13. The computer-implemented method according to claim 12 wherein the host controller is a USB host controller.

14. The computer-implemented method according to claim 9 wherein converting digital data to analog includes modulating the digital data into the analog audio signal.

15. The computer-implemented method according to claim 14 wherein converting digital data comprises converting the digital data with a frequency shift key generator.

16. The computer-implemented method according to claim 15 wherein hardware component includes a microcontroller.

17. The computer-implemented method according to claim 16 wherein the microcontroller comprises a serial port coupled to the credit card reader.

18. The computer-implemented method according to claim 9 further comprising decoding the analog audio signal to process the digital data.

19. A method for delivering data to a cloud service, the method comprising:
  receiving, at a hardware component, digital data from a credit card reader;
  buffering, at the hardware component, the digital data received from the credit card reader;
  converting, with a microcontroller included in the hardware component, the digital data into an analog audio signal;
  delivering the analog audio signal to an audio input of a mobile device through a connector that couples to an audio input port of the mobile device, wherein the connector bridges a microphone pin of the audio input port such that the mobile device detects a presence of the connector in the audio input port;
  receiving at the mobile device the analog audio signal and converting the analog audio signal into binary data; and
  uploading the binary data without significant change from the mobile device to a cloud service for decoding.

20. The method according to claim 19 wherein buffering the digital data includes buffering the digital data to fit a 1200-baud FSK rate running on the mobile device.

21. The method according to claim 19 wherein the hardware component includes a USB host controller that couples the hardware component to the credit card reader.

22. The method according to claim 19 wherein converting data to the analog audio signal comprises modulating the data into the analog audio signal.

23. The method according to claim 19 wherein converting data comprises modulating the data using a frequency shift key generator for use of harmonic frequencies wherein a tone of 8000 Hz signifies a digital 1 and a tone of 4000 Hz signifies a digital 0.

24. The method according to claim 19 wherein the microcontroller comprises a communication controller disposed between a serial port and a frequency shift key generator.

25. The method according to claim 19 further comprising decoding the analog audio signal on the mobile device to process the data.

26. The method according to claim 25 wherein decoding the analog audio signal comprises using a frequency shift key detector to produce an output from the analog audio signal.

27. The method according to claim 26 wherein decoding the analog audio signal comprises converting the output of the frequency shift key detector to binary data.

28. The method of claim 19, further comprising: assembling, at the cloud service, the binary data; and
  comparing, at the cloud service, the binary data to a scan code to decode the binary data.

29. The computer-implemented method of claim 9, further comprising:
  prior to converting, buffering the digital data received from the credit card reader.

30. The method of claim 19, further comprising:
  decoding, at the cloud service, the binary data.

* * * * *

Disclaimer

9,800,706 B2 - Damien Phelan Stolarz, Canoga Park, CA (US); George Dean, IV, Simi Valley, CA (US); Zack Gainsforth, Lafayette, CA (US). ELECTRONIC DEVICE INPUT/OUTPUT SYSTEM AND METHOD. Patent dated October 24, 2017. Disclaimer filed May 3, 2019, by the assignee, MOBILEPAY LLC.

I hereby disclaim the following complete claims 19, 21, 22 and 25 of said patent.

*(Official Gazette, October 25, 2022)*